(12) United States Patent
Lewis

(10) Patent No.: US 6,721,865 B2
(45) Date of Patent: Apr. 13, 2004

(54) ELIMINATION OF COLORING DURING OBJECT CREATION FOR CONCURRENT GARBAGE COLLECTION

(75) Inventor: Ethan Lewis, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 09/829,652

(22) Filed: Apr. 10, 2001

(65) Prior Publication Data
US 2002/0147899 A1 Oct. 10, 2002

(51) Int. Cl.$^7$ .............................................. G06F 12/00
(52) U.S. Cl. ...................... 711/170; 711/205; 711/206
(58) Field of Search ................................ 707/206, 205; 711/170

(56) References Cited

U.S. PATENT DOCUMENTS

| | | | |
|---|---|---|---|
| 6,038,572 A | * 3/2000 | Schwartz et al. | 707/206 |
| 6,047,295 A | * 4/2000 | Endicott et al. | 707/206 |
| 6,098,080 A | * 8/2000 | Endicott et al. | 707/206 |
| 6,192,517 B1 | * 2/2001 | Agesen et al. | 717/154 |
| 6,253,215 B1 | * 6/2001 | Agesen et al. | 707/206 |
| 6,289,360 B1 | * 9/2001 | Kolodner et al. | 707/206 |
| 6,349,312 B1 | * 2/2002 | Fresko et al. | 707/205 |
| 6,363,403 B1 | * 3/2002 | Roy et al. | 707/206 |
| 6,393,440 B1 | * 5/2002 | Salant et al. | 707/206 |
| 6,453,403 B1 | * 9/2002 | Czajkowski | 711/170 |
| 6,502,111 B1 | * 12/2002 | Dussud | 707/206 |
| 2002/0078002 A1 | * 6/2002 | Bottomley et al. | 707/1 |

OTHER PUBLICATIONS

E.W. Dijkstra et al., "On–the–Fly Garbage Collection: An Exercise in Cooperation", Communications of the ACM 21:11)1978), pp. 966–975.

D. Doligez et al., "A Concurrent Generational Garbage Collector for a Multithreaded Implementation of ML", Proceedings of the $20^{th}$ Symposium on Principles of Programming Languages (1993), pp. 113–123.

D. Doligez et al., "Portable, Unobtrusive Garbage Collection for Multiprocessor Systems", Conference Record of the Twenty–First Annual ACM Symposium on Principles of Programming Languages (1994), pp. 70–83.

P. Hudak et al., Garbage Collection and Task Deletion in Distributed Applicative Processing Systems:, ACM Symposium on Lisp and Functional Programming (1982), pp. 168–178.

L. Lamport, "Garbage Collection with Multiple Processes: An Exercise in Parallelism", Massachusetts Computer Associates, Inc., Wakefield, Mass. 1978, pp. 50–54.

* cited by examiner

Primary Examiner—Hong Kim
(74) Attorney, Agent, or Firm—Darby & Darby (57) ABSTRACT

A method for memory management in execution of a program by a computer having a memory includes setting an attribute of an unallocated unit of the memory in preparation for allocation of the memory in the unit, and allocating respective portions of the memory in the unit to data objects to be held in a heap created by the program. Responsive to the attribute that is set on the allocated portions of the memory, the data objects in the heap are traced, so as to mark the data objects that are reachable at a given stage in the program. The heap is then swept so as to free the memory that is allocated to data objects that are not marked as reachable, for reallocation to new data objects.

45 Claims, 3 Drawing Sheets

ELIMINATION OF COLORING DURING OBJECT CREATION FOR CONCURRENT GARBAGE COLLECTION

FIELD OF THE INVENTION

The present invention relates generally to efficient use of computer memory in carrying out program instructions, and specifically to methods and apparatus for garbage collection, i.e., for automatic reclamation of unused memory.

BACKGROUND OF THE INVENTION

Programming languages such as Java relieve the programmer of the burden of explicit memory management through the use of automatic garbage collection (GC) techniques that are applied "behind the scenes." When a data object is created, space for the object is allocated in the heap. Unused data objects, which are no longer reachable by the running program via any path of pointer traversals, are considered "garbage." GC automatically reclaims computer storage assigned to such objects, in order to free the storage for reuse. This makes programming in garbage-collected languages significantly easier than in C or C++, for example, in which the programmer must include an explicit "free" statement in order to reclaim memory. GC allows many run-time errors to be avoided and naturally supports modular programming.

A variety of different GC techniques are known in the art. In mark-sweep garbage collectors, garbage collection is implemented in two successive stages. In a first stage, an object graph is created, tracing the interrelation of objects starting from specified roots and traversing all connected objects in the heap. Objects that are reachable on this graph are considered live objects. Any other object is considered garbage and can be collected. The live objects are marked in some way so as to distinguish between live objects and garbage. In a second stage, the memory is swept, and all memory space occupied by unmarked objects (garbage) is reclaimed, so that it is free to be reallocated. During the sweep stage, the marked objects are unmarked, in preparation for the next GC cycle.

In "concurrent" GC, the execution of application program threads that may update and change the object graph goes on concurrently with the marking and sweeping operations carried out by a collector thread. For this reason, threads of the running program are referred to as "mutators," since they mutate, or change, the object graph. Although the concurrent approach avoids processor inactivity during GC, the running program may change the object graph even during the very steps of tracing out reachable data objects by the collector. As a result, there is a risk that the collector may miss marking a live object, and the live object will then be reclaimed during the sweep phase of the collector. In order to avoid this possibility, synchronization between the mutator and collector threads is essential.

"On-the-fly" concurrent GC schemes use implicit synchronization between the mutator and collector threads in order to allow the threads to run concurrently without having to stop for synchronization. This type of GC was first described by Dijkstra et al., in "On-the-Fly Garbage Collection: An Exercise in Cooperation," published in *Communications of the ACM* 21:11 (1978), pages 966–975, which is incorporated herein by reference. Reachable objects are marked by assigning a different "color" attribute to each object, with "white" indicating unmarked objects, and "black" indicating marked objects. At the beginning of a GC cycle, all objects are white. Whenever a mutator uses a white object, it marks the object "gray." When the collector encounters a gray object, it knows that while the object is alive, its direct descendants in the pointer graph may not yet have been marked (i.e., some may still be white). On the other hand, when an object is marked black, all of its direct descendants are necessarily marked as well, either gray or black. During the mark/trace phase, the collector traces the graph of live objects, and in doing so changes the color of all gray objects to black and their descendants to gray, continuing until no untraced gray objects remain. After all of the live objects have been traced, the collector then sweeps: white objects are reclaimed and appended to the list of free memory, while black objects are changed to white in preparation for the next collection cycle.

Dijkstra's approach, while conceptually valuable, has inherent inefficiencies that have prevented it from being widely implemented in practice. Doligez and associates have attempted to overcome these limitations by adding a fourth color: "blue." During the sweep phase, the collector marks white objects as blue, to distinguish them as free. This approach is described by Doligez and Leroy, in "A Concurrent Generational Garbage Collector for a Multithreaded Implementation of ML," published in *Proceedings of the 20th Symposium on Principles of Programming Languages* (1993), pages 113–123; and by Doligez and Gonthier, in "Portable Unobtrusive Garbage Collection for Multi-Processor Systems," published in the *Conference Record of the Twenty-first Annual ACM Symposium on Principles of Programming Languages* (1994), pages 70–83. Both of these publications are incorporated herein by reference.

Marking free memory as blue frees the collector from having to trace the list of free memory, but it obligates the mutators to properly color all new objects that they allocate (i.e., objects they create from free memory). The proper color for allocation depends on the stage of the collection cycle currently being executed by the collector thread. While no GC is taking place and at the start of the collection cycle, the proper color is white. At a transition point for each mutator during the mark/trace phase of the collector (the point at which the collector has marked the mutator's local stack), the proper allocation color becomes black. During the sweep phase of the collector, the color for allocation can be white, gray or black, depending on the address of the object being created relative to the progress of the collector in sweeping the heap.

The collector uses a handshaking protocol to synchronize the mutators with its state, so that the mutators use the correct coloring. Proper execution of the protocol is critical: if a newly-allocated object is colored white at the wrong time, it will be incorrectly collected. If it is incorrectly colored black, before its immediate descendants have been marked, the descendants may be incorrectly collected. This problem can be alleviated by extending the period during which the mutators color objects gray, since neither gray objects nor their descendants are collected in any given GC cycle. This solution, however, runs counter to the primary goal of GC, which is to free unused memory.

One alternative solution to the problem of synchronizing the mutators with the collector is to switch the meaning of the colors "black" and "white" from one GC cycle to the next. An approach of this sort is described by Hudak and Keller, in "Garbage Collection and Task Deletion in Distributed Applicative Processing Systems," published in the *ACM Symposium on Lisp and Functional Programming* (1982), pages 168–178, which is incorporated herein by reference. This approach, however, is designed to work in a specific parallel processing system, in which the role of the program stack is taken over by a "marking-tree" of tasks. It does not appear to be of general applicability in on-the-fly GC for use with Java and other common software environments.

SUMMARY OF THE INVENTION

Preferred embodiments of the present invention provide a method for on-the-fly GC in which objects are colored before they are created, thus relieving the mutators of a major part of the burden of object coloring. This technique is referred to hereinafter as "pre-coloring." Preferably, the mutators pre-color blocks of memory while preparing them for allocation, as a batch operation, instead of coloring objects singly as they are created as in methods known in the art. Periodically, the collector checks the memory that is prepared for allocation to ensure that it has the proper allocation color. Thus, the coloring overhead is borne primarily by the collector, and the speed and efficiency of memory allocation by the mutators are increased. In some embodiments, the elimination of coloring during allocation can also help to prevent race conditions between allocation of objects by mutators and marking of the objects by the collector, which are of concern in on-the-fly GC methods known in the art.

In some preferred embodiments of the present invention, a color switching scheme is used to change the allocation color from one GC cycle to the next. A preferred color switching scheme is described in U.S. patent application Ser. No. 09/167,546, to Kolodner and Lewis, which is assigned to the assignee of the present patent application and is incorporated herein by reference. In this scheme, the constant colors white and black that are used in conventional on-the-fly GC are replaced by global variables "whiteColor" and "blackColor," whose values are interchanged after every GC cycle. For the purposes of the present invention, another global variable, "allocationColor," is defined for assignment to blocks of memory being prepared for allocation by the mutators. Between one collection cycle and the next, the value of allocationColor is equal to the blackColor of the preceding cycle (which is the whiteColor of the next cycle). The collector preferably updates allocationColor only once per allocation cycle, from the whiteColor to the blackColor of that cycle.

Although these preferred embodiments use block-based memory allocation and the color switching scheme of Kolodner and Lewis, the principles of the present invention are also applicable to other methods of memory allocation and concurrent GC, including on-the-fly GC. For example, the techniques of pre-coloring taught by the present invention may be used, mutatis mutandis, with the color switching scheme of Hudak and Keller, or with the conventional, fixed-color scheme of Doligez and associates, as described in the Background of the Invention.

There is therefore provided, in accordance with a preferred embodiment of the present invention, a method for memory management in execution of a program by a computer having a memory, including:

setting an attribute of an unallocated unit of the memory in preparation for allocation of the memory in the unit;

allocating respective portions of the memory in the unit to data objects to be held in a heap created by the program;

responsive to the attribute that is set on the allocated portions of the memory, tracing the data objects in the heap so as to mark the data objects that are reachable at a given stage in the program; and sweeping the heap so as to free the memory that is allocated to data objects that are not marked as reachable, for reallocation to new data objects.

Preferably, tracing the data objects and sweeping the heap include tracing the data objects and sweeping the heap periodically in garbage collection (GC) cycles, and wherein setting the attribute includes setting the attribute to a variable value that changes in each cycle to a new value. Most preferably, setting the attribute to the variable value includes providing at least two different values of the attribute, and alternating between the values in consecutive GC cycles. Additionally or alternatively, setting the attribute includes choosing the value of the attribute to set at each cycle such that the data objects allocated with the set value of the attribute will be traced and marked as reachable at the next cycle. Preferably, setting the attribute includes changing the variable value to the new value after beginning the step of tracing the data objects but before sweeping the heap.

Preferably, setting the attribute includes, after changing the variable value to the new value for a given one of the cycles, checking free memory remaining in the unallocated unit that was prepared for allocation prior to the given cycle, so as to ensure that the attribute of all of the free memory remaining is set to the new value. Further preferably, checking the free memory includes determining whether any of the memory in the unit was allocated over a predetermined period preceding the given cycle, and making the unit unavailable for allocation if none of the memory was allocated over the predetermined period. Most preferably, checking the free memory includes changing the attribute of the free memory remaining to the new value. Alternatively, setting the attribute includes, after changing the variable value to the new value for a given one of the cycles, rendering free memory remaining the unallocated unit that was prepared for allocation prior to the given cycle unavailable for allocation in the given cycle.

In a preferred embodiment, setting the attribute includes setting the attribute using a collector thread, which further performs the steps of tracing the data objects and sweeping the heap, and allocating the respective portions of the memory includes preparing the unallocated unit of the memory and allocating the data objects using a mutator thread generated by the program, separate from the collector thread. Preferably, the mutator thread is further operative to alter data pointers associated with the data objects that it has allocated and to change the attribute of the data objects upon altering the pointers so that the objects are marked as reachable. Most preferably, the collector thread and mutator thread operate on the memory concurrently, wherein the mutator thread changes the attribute upon altering the pointers to a value that is assigned by the collector thread, and which varies depending on a stage of progress by the collector thread in tracing the data objects and sweeping the heap. Preferably, allocating the data objects includes allocating the objects using the mutator thread without changing the attribute that has been set by the collector thread.

In a preferred embodiment, the unit of memory includes a block in a block-managed memory system, and wherein allocating the respective portions includes allocating multiple data objects within the block.

There is also provided, in accordance with a preferred embodiment of the present invention, computing apparatus, including:

a memory, arranged to store data; and a processor, coupled to allocate the memory for execution of a program running on the apparatus by setting an attribute of an unallocated unit of the memory in preparation for allocation of the unit, and allocating respective portions of the memory in the unit to data objects to be held in a heap created by the program, such that responsive to the attribute that is set on the allocated portions of the memory, the processor is operative to trace the data objects in the heap so as to mark the data objects that are reachable at a given stage in the program, and to sweep the heap so as to free the memory that is allocated to data objects that are not marked as reachable, for reallocation to new data objects.

There is additionally provided, in accordance with a preferred embodiment of the present invention, a computer program product, including a computer-readable medium in which program instructions are stored, which instructions, when read by a computer having a memory and arranged to carry out execution of a program using the memory, cause the computer to set an attribute of an unallocated unit of the memory in preparation for allocation of the memory in the unit, to allocate respective portions of the memory in the unit to data objects to be held in a heap created by the program, and responsive to the attribute that is set on the allocated portions of the memory, to trace the data objects in the heap so as to mark the data objects that are reachable at a given stage in the program, and to sweep the heap so as to free the memory that is allocated to data objects that are not marked as reachable, for reallocation to new data objects.

The present invention will be more fully understood from the following detailed description of the preferred embodiments thereof, taken together with the drawings in which:

DETAILED DESCRIPTION OF PREFERRED EMBODIMENTS

Figure 1:
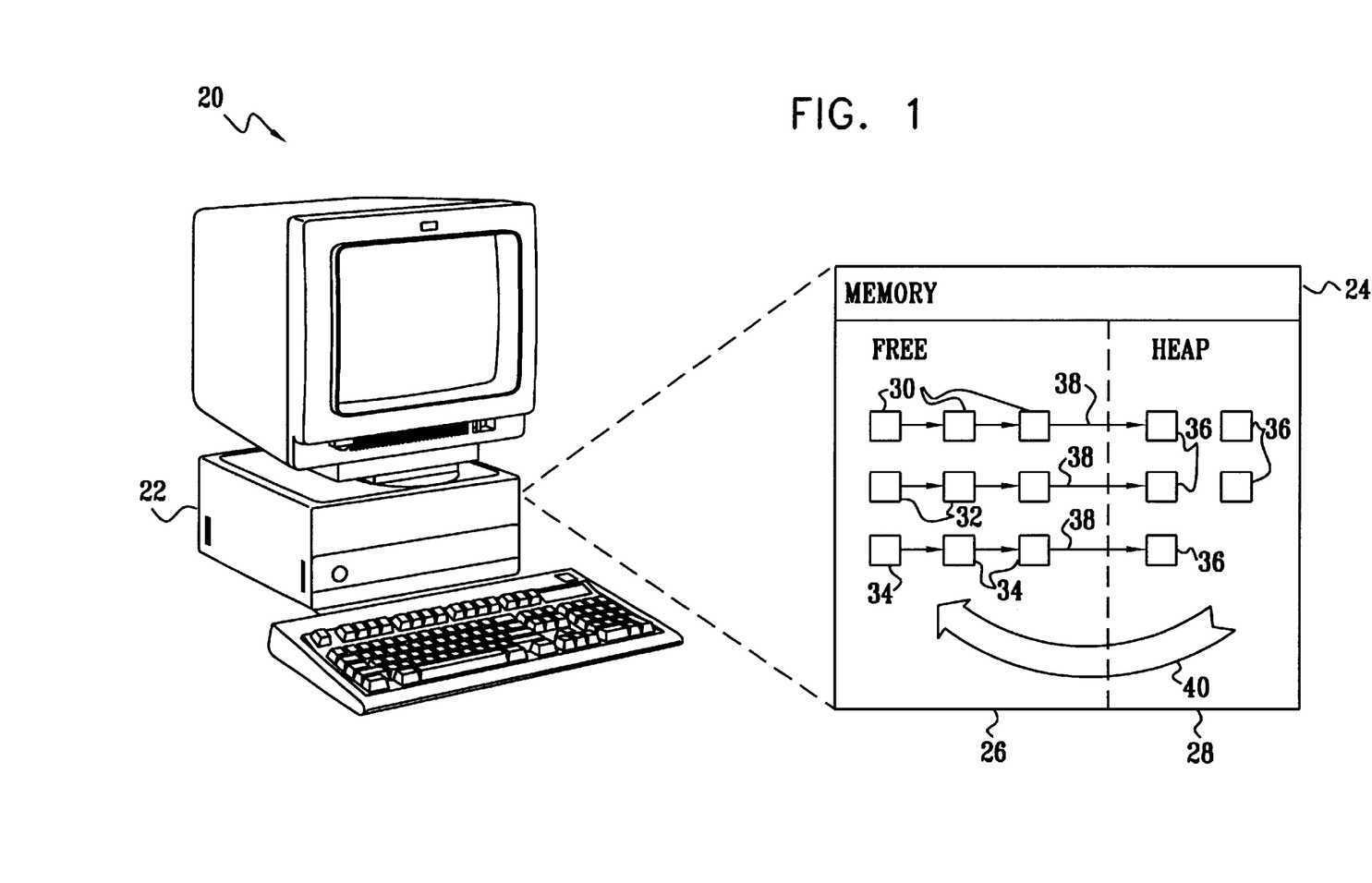
FIG. 1 is a schematic representation of a computer system, adapted to run program code using memory allocation and garbage collection (GC), in accordance with a preferred embodiment of the present invention.

Reference is now made to FIG. 1, which is a schematic, partly pictorial representation of a computer system 20 for running program code with memory allocation and garbage collection (GC), in accordance with a preferred embodiment of the present invention. The system comprises a processor 22 and a memory 24, which typically includes both RAM and disk memory used in storing and running software code, preferably Java language code. Alternatively, the principles described hereinbelow may be applied to code written in other programming languages that allow for GC.

In the general, conceptual view shown in FIG. 1, memory 24 comprises, inter alia, a free portion 26, holding unallocated memory, and a heap 28 of allocated objects. (The separation of the free and heap portions of the memory is, of course, only conceptual, and these portions are generally interspersed in the physical memory of the processor.) Processor 22 manages memory 24 by organizing free memory 26 into blocks, preferably blocks of different sizes 30, 32 and 34. Initially, when a program thread, or mutator, represented in FIG. 1 by arrows 38, needs to allocate memory to a new object, it prepares a free block 30, 32 or 34 of appropriate size. Preparation of the free block includes pre-coloring the block with a designated allocationColor, as described in detail hereinbelow. The mutator then allocates all or part of the block, creating an object 36 in heap 28. As new objects need to be created, the mutator continues to use the memory in the block that it has prepared until it has allocated all of the free memory in the block. It then prepares and begins allocating another block from free memory 26.

Periodically, a GC thread, or collector, represented by an arrow 40, marks, traces and sweeps objects 36, so as to return memory that is allocated to unreachable objects to the pool of free memory 26. As the memory is freed, it is reorganized into blocks 30, 32 and 34, for pre-coloring and reallocation by the mutators. In addition to the benefits of pre-coloring for GC of heap 28, block management of the heap memory helps to reduce memory fragmentation, as well. This defragmentation mechanism is particularly important when concurrent GC is used (as in system 20), since there is no time at which the mutator threads can be stopped to allow memory compaction to be carried out.

The GC-related functions carried out by system 20 are typically performed by software running on processor 22. The specific software code for GC is preferably supplied as a part of a Java Virtual Machine (JVM) package or other program execution module, but it may alternatively be supplied separately as an add-on or plug-in to an existing software package. The software packages and code may be supplied on tangible media, such as diskettes or CD-ROM, and loaded into the system. Alternatively, the software may be downloaded to the system via a network connection or other electronic link.

Figure 2:
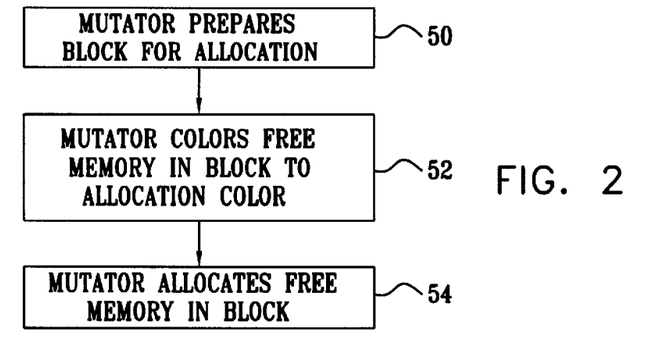
FIG. 2 is a flow chart that schematically illustrates a method for memory allocation, in accordance with a preferred embodiment of the present invention.

FIG. 2 is a flow chart that schematically illustrates a method for memory allocation by mutators running on processor 22, in accordance with a preferred embodiment of the present invention. In a preparatory step 50, a mutator prepares a block of free memory 26 for allocation. This step typically involves actions such as clearing the memory in the block, dividing the block into chunks, and inserting pointers from one chunk to the next. In conjunction with this preparation, the mutator colors the free chunks in the block, at a pre-coloring step 52, using a variable allocationColor that was assigned by the collector during the most recent GC cycle. The allocation color preferably alternates once per cycle, based on the interchanging values of the global variables whiteColor and blackColor, as described in the above-mentioned U.S. patent application Ser. No. 09/167,546. During odd cycles of the GC, whiteColor is set to the constant value Color1, while blackColor is set to Color2. On even cycles, the values of the variables are reversed. During the mark/trace and sweep phases of GC, the collector relates to the whiteColor and blackColor variables in essentially the same manner as the collector in the scheme of Doligez and associates relates to the constant values White and Black. The value of allocationColor used at step 52 of the present embodiment in between GC cycles is equal to the value of blackColor in the preceding cycle (or equivalently, the value of whiteColor in the next cycle). The value of allocationColor is updated once per cycle, from whiteColor to blackColor, by the collector.

Having prepared and pre-colored a block of free memory, the mutator begins to allocate data objects from the block, at an allocation step 54. In between successive updates of the allocationColor variable, all allocated objects receive this same color. As noted above, when the mutator uses up the free memory in a block that it has prepared, it takes another free block and prepares and pre-colors it for allocation.

Figure 3:
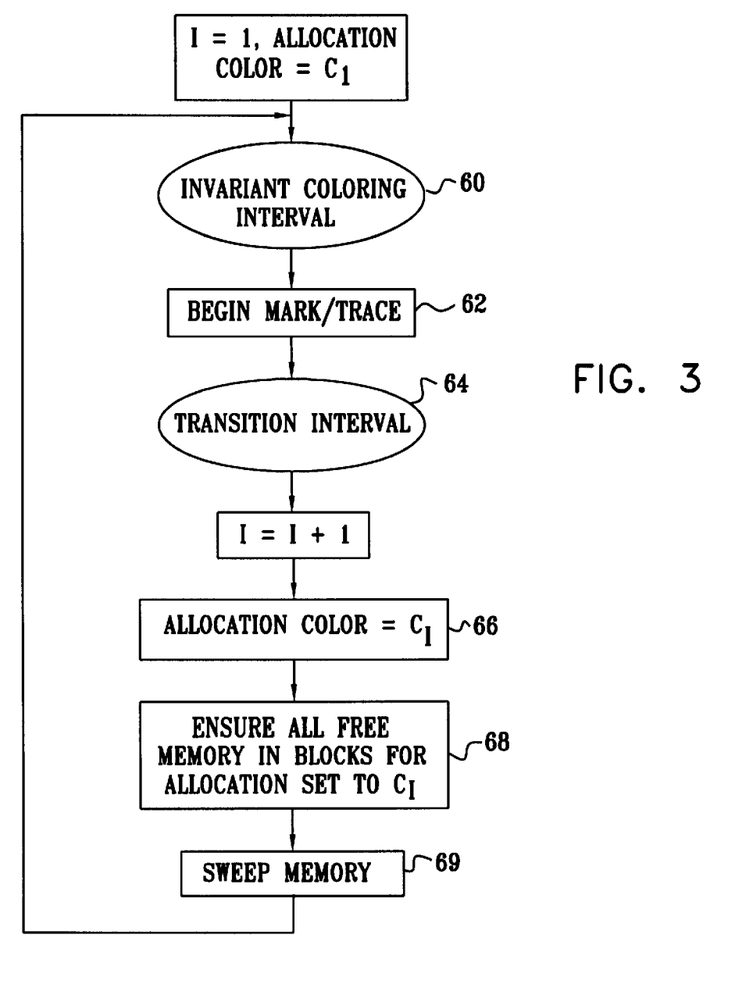
FIG. 3 is a flow chart that schematically illustrates a method for on-the-fly GC, in accordance with a preferred embodiment of the present invention.

FIG. 3 is a flow chart that schematically illustrates the actions of the collector thread that are carried out in coordination with the mutator thread actions of FIG. 2, in accordance with a preferred embodiment of the present invention. The method of FIG. 3 uses a cycle index I, which is incremented at each GC cycle. It divides the period from one GC cycle to the next into an invariant coloring interval 60 and a transition interval 64. During the invariant interval, which includes at least the time from the end of one GC cycle to the beginning of the next, there is a single valid allocation color for all mutator threads operating on memory 24. During the transition intervals, the allocation color may be either whiteColor or blackColor, depending on the individual mutator, and either color may be used safely.

GC cycles of the collector include a mark/trace phase 62 and a sweep phase 69. As described in U.S. patent application Ser. No. 09/167,546, during marking, all objects that are considered to be roots of the reachability graph are colored gray. Then, the collector performs a tracing loop over all gray objects, in which all of the whiteColor descendants of each gray object are colored gray, and the gray parent object is colored blackColor. The loop terminates when there are no more gray objects. At this point, sweep phase 69 begins, and the collector colors the remaining whiteColor objects blue and sweeps them into free memory 26. The values of blackColor and whiteColor are then reversed, so that all of the live objects become whiteColor objects. At an appropriate point in the GC cycle, the value of allocationColor is likewise switched to the blackColor of the next cycle, at a color updating step 66. The entire process can then repeat itself indefinitely.

Transition interval 64 preferably coincides with a portion of the GC cycle, and most preferably with a portion of mark/trace phase 62. To define the transition interval, we note that when a mutator updates a pointer to a whiteColor object while the collector is tracing, the mutator must color the object gray, so that the collector will not fail to mark and trace it as a live object. Once all of the mutators have been notified that the trace is in progress and have accordingly reached the point of graying any whiteColor objects that they update, blackColor can validly be used as the allocation color. This point is referred to as "All Graying."

On the other hand, once the collector has begun to mark the local roots of a given mutator (typically on the stack of the thread), it is no longer safe to use whiteColor as the allocation color for the mutator. The reason is that after the local roots have been marked, a whiteColor object with a pointer in the stack but none on the heap will have its heap memory freed by the collector. Thus, whiteColor can validly be used as a global allocation color only as long as none of the local roots have been marked by the collector, referred to herein as "None Marked." It cannot be used as the allocation color for any of the mutators after the point of "All Marked," at which the collector has marked the local roots of all of the mutators.

Invariant interval 60 preferably includes at least the period from "All Marked" in one GC cycle to "All Graying" in the next cycle. During this period, the allocation color must remain constant. From "All Graying" to "None Marked" within one GC cycle, the allocation color for any object may be either whiteColor or blackColor. After "None Marked," the allocation color must be blackColor, and allocationColor is therefore assigned the value of blackColor from "None Marked" until "All Graying" in the next cycle.

Thus, transition interval 66 is preferably identified as the period from "All Graying" to "None Marked." Alternatively, other choices of transition interval may be used, depending inter alia on the nature of the GC scheme and the characteristics of the GC cycle.

During each transition interval, the collector updates the value of allocationColor to its new value $C_I$, at color updating step 66. Memory allocation during the next invariant interval 60 will use this allocation value, as described above with reference to FIG. 2. During transition interval 64, the blocks of free memory that have been prepared by the mutators for allocation are reviewed, at a block review step 68. This step is preferably carried out by the collector, but it may alternatively be performed by the mutator. During this step, it is necessary to ensure that any free memory in the blocks prepared for allocation is of the appropriate color $C_I$. This step is needed because mutators may earlier have prepared blocks for allocation using the previous value of the allocation color, $C_{I-1}$. Unlike GC methods known in the art, preferred embodiments of the present invention preferably place the responsibility for ensuring that the correct allocation color is used mainly on the collector.

Figure 4:
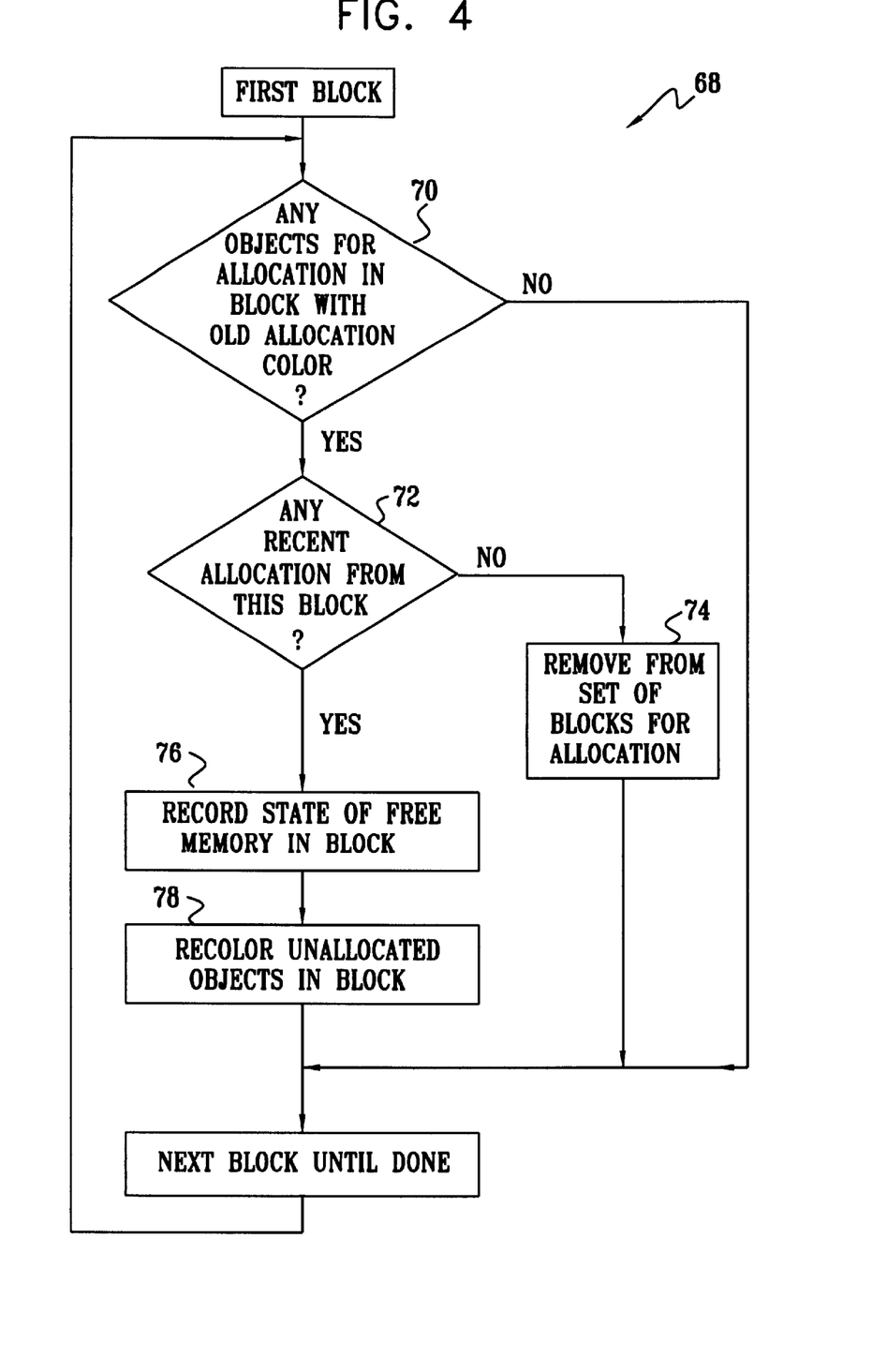
FIG. 4 is a flow chart that schematically shows a detail of the method of FIG. 3, in accordance with a preferred embodiment of the present invention.

FIG. 4 is a flow chart that schematically shows details of block review step 68, in accordance with a preferred embodiment of the present invention. The procedure shown in FIG. 4 is carried out for all of the blocks in free memory 26 that have been prepared for allocation, but have not yet been allocated to the heap. This procedure is preferably performed by the collector, in order to relieve the mutators of work associated with GC, and therefore, in the description below, reference is made to the collector. The procedure may alternatively be performed by the mutators, mutatis mutandis. At a color checking step 70, after having switched the value of allocationColor, the collector checks each block to determine whether it has any memory remaining available for allocation with the old allocation color. If not, the collector goes on to the next block.

If there is memory available in the block with the old allocation color, the collector checks whether there has been any recent allocation of an object from this block, at a recent allocation step 72. Typically, a "recent" allocation is one that took place since the last GC cycle. If there has been no such allocation, the collector preferably removes the block from the set of allocation sources, at a removal step 74. The determination of step 72 is preferably made simply by examining memory 24 itself, without having to query the mutators. For example, the collector may keep a record for each block of the next expected address for allocation in the block. If the address is unchanged over a GC cycle, the collector can conclude that no allocation was made. Removing the unused block from the set at step 74 is a simpler action for the collector than is recoloring the free memory in the block, particularly since the collector may incur a page fault in attempting to recolor the block.

If the collector determines at step 72 that there has been a recent memory allocation made from the block in question, it records the state of the free memory in the block, at a recording step 76. This record is used in recoloring all expected future objects in the block to the new allocation color, at a recoloring step 78. This process continues, as noted above, until all of the blocks awaiting allocation have been processed.

In an alternative embodiment of the present invention, not shown in the figures, the collector and mutators do not check whether there is free memory remaining in previously-prepared blocks at step 68. Instead, blocks that were made available for allocation, and were accordingly pre-colored, in the preceding cycle are simply made unavailable for allocation in the new cycle. This approach simplifies still further the actions that the collector must take in step 68. Referring to FIG. 4, implementation of this approach would result in the removal of steps 70, 72, 76 and 78 from the flow chart, so that only step 74 is repeated for each of the pre-colored blocks until done.

Although preferred embodiments are described above with reference to system 20, using block-based memory allocation, the principles of pre-coloring taught by the present invention are also applicable to other methods of memory allocation and concurrent GC. Similarly, while these preferred embodiments are based on the color switching scheme of Kolodner and Lewis, pre-coloring may also be employed using other color switching schemes or without color switching from one GC cycle to the next. The modifications necessary to adapt the particular methods described herein to other types of memory management and different GC approaches will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for memory management in execution of a program by a computer having a memory, comprising:

setting an attribute of an unallocated unit of the memory in preparation for allocation of the memory in the unit;

allocating respective portions of the memory in the unit to data objects to be held in a heap created by the program;

responsive to the attribute that is set on the allocated portions of the memory, tracing the data objects in the heap so as to mark the data objects that are reachable at a given stage in the program; and sweeping the heap so as to free the memory that is allocated to data objects that are not marked as reachable, for reallocation to new data objects.

2. A method according to claim 1, wherein tracing the data objects and sweeping the heap comprise tracing the data objects and sweeping the heap periodically in garbage collection (GC) cycles, and wherein setting the attribute comprises setting the attribute to a variable value that changes in each cycle to a new value.

3. A method according to claim 2, wherein setting the attribute to the variable value comprises providing at least two different values of the attribute, and alternating between the values in consecutive GC cycles.

4. A method according to claim 2, wherein setting the attribute comprises choosing the value of the attribute to set at each cycle such that the data objects allocated with the set value of the attribute will be traced and marked as reachable at the next cycle.

5. A method according to claim 2, wherein setting the attribute comprises changing the variable value to the new value after beginning the step of tracing the data objects but before sweeping the heap.

6. A method according to claim 2, wherein setting the attribute comprises, after changing the variable value to the new value for a given one of the cycles, checking free memory remaining in the unallocated unit that was prepared for allocation prior to the given cycle, so as to ensure that the attribute of all of the free memory remaining is set to the new value.

7. A method according to claim 6, wherein checking the free memory comprises determining whether any of the memory in the unit was allocated over a predetermined period preceding the given cycle, and making the unit unavailable for allocation if none of the memory was allocated over the predetermined period.

8. A method according to claim 6, wherein checking the free memory comprises changing the attribute of the free memory remaining to the new value.

9. A method according to claim 2, wherein setting the attribute comprises, after changing the variable value to the new value for a given one of the cycles, rendering free memory remaining unallocated in the unit that was prepared for allocation prior to the given cycle unavailable for allocation in the given cycle.

10. A method according to claim 1, wherein setting the attribute comprises setting the attribute using a collector thread, which further performs the steps of tracing the data objects and sweeping the heap, and wherein allocating the respective portions of the memory comprises preparing the unallocated unit of the memory and allocating the data objects using a mutator thread generated by the program, separate from the collector thread.

11. A method according to claim 10, wherein the mutator thread is further operative to alter data pointers associated with the data objects that it has allocated and to change the attribute of the data objects upon altering the pointers so that the objects are marked as reachable.

12. A method according to claim 11, wherein the collector thread and mutator thread operate on the memory concurrently.

13. A method according to claim 12, wherein the mutator thread changes the attribute upon altering the pointers to a value that is assigned by the collector thread, and which varies depending on a stage of progress by the collector thread in tracing the data objects and sweeping the heap.

14. A method according to claim 10, wherein allocating the data objects comprises allocating the objects using the mutator thread without changing the attribute that has been set by the collector thread.

15. A method according to claim 1, wherein the unit of memory comprises a block in a block-managed memory system, and wherein allocating the respective portions comprises allocating multiple data objects within the block.

16. Computing apparatus, comprising:

a memory, arranged to store data; and a processor, coupled to allocate the memory for execution of a program running on the apparatus by setting an attribute of an unallocated unit of the memory in preparation for allocation of the unit, and allocating respective portions of the memory in the unit to data objects to be held in a heap created by the program, such that responsive to the attribute that is set on the allocated portions of the memory, the processor is operative to trace the data objects in the heap so as to mark the data objects that are reachable at a given stage in the program, and to sweep the heap so as to free the memory that is allocated to data objects that are not marked as reachable, for reallocation to new data objects.

17. Apparatus according to claim 16, wherein the processor is operative to trace the data objects and to sweep the heap periodically in garbage collection (GC) cycles, and to set the attribute to a variable value that changes in each cycle to a new value.

18. Apparatus according to claim 17, wherein the processor is operative to set the attribute to one of at least two values, alternating between consecutive GC cycles.

19. Apparatus according to claim 17, wherein the value of the attribute to set at each cycle is chosen such that the data objects allocated with the set value of the attribute will be traced and marked as reachable at the next cycle.

20. Apparatus according to claim 17, wherein the processor is operative to change the variable value to the new value after beginning to trace the data objects but before sweeping the heap.

21. Apparatus according to claim 17, wherein the processor is operative, after changing the variable value to the new value for a given one of the cycles, to check free memory remaining in the unallocated unit that was prepared for allocation prior to the given cycle, so as to ensure that the attribute of all of the free memory remaining is set to the new value.

22. Apparatus according to claim 21, wherein in checking the free memory, the processor is arranged to determine whether any of the memory in the unit was allocated over a predetermined period preceding the given cycle, and to make the unit unavailable for allocation if none of the memory was allocated over the predetermined period.

23. Apparatus according to claim 21, wherein in checking the free memory, the processor is arranged to change the attribute of the free memory remaining to the new value.

24. Apparatus according to claim 17, wherein the processor is operative, after changing the variable value to the new value for a given one of the cycles, to render free memory remaining in the unallocated unit that was prepared for allocation prior to the given cycle unavailable for allocation in the given cycle.

25. Apparatus according to claim 16, wherein a collector thread running on the processor is operative to set the attribute, and further to trace the data objects and sweep the heap, and wherein a mutator thread generated by the program, separate from the collector thread, is operative to prepare the unallocated unit of the memory and to allocate the data objects.

26. Apparatus according to claim 25, wherein the program thread is further operative to alter data pointers associated with the data objects that it has allocated and to change the attribute of the data objects upon altering the pointers so that the objects are marked as reachable.

27. Apparatus according to claim 26, wherein the collector thread and mutator thread operate on the memory concurrently.

28. Apparatus according to claim 27, wherein the mutator thread changes the attribute upon altering the pointers to a value that is assigned by the collector thread, and which varies depending on a stage of progress by the collector thread in tracing the data objects and sweeping the heap.

29. Apparatus according to claim 25, wherein the mutator thread allocates the objects without changing the attribute that has been set by the collector thread.

30. Apparatus according to claim 16, wherein the memory comprises a block-managed memory, and the unit of the memory comprises a block in the system, and wherein the processor is operative to allocate multiple data objects within the block.

31. A computer program product, comprising a computer-readable medium in which program instructions are stored, which instructions, when read by a computer having a memory and arranged to carry out execution of a program using the memory, cause the computer to set an attribute of an unallocated unit of the memory in preparation for allocation of the memory in the unit, to allocate respective portions of the memory in the unit to data objects to be held in a heap created by the program, and responsive to the attribute that is set on the allocated portions of the memory, to trace the data objects in the heap so as to mark the data objects that are reachable at a given stage in the program, and to sweep the heap so as to free the memory that is allocated to data objects that are not marked as reachable, for reallocation to new data objects.

32. A product according to claim 31, wherein the instructions cause the computer to trace the data objects and to sweep the heap periodically in garbage collection (GC) cycles, and to set the attribute to a variable value that changes in each cycle to a new value.

33. A product according to claim 32, wherein the variable value comprises at least two values of the attribute, and wherein the instructions cause the computer to alternate between the values in consecutive GC cycles.

34. A product according to claim 32, wherein the instructions cause the computer to set the value of the attribute at each cycle such that the data objects allocated with the set value of the attribute will be traced and marked as reachable at the next cycle.

35. A product according to claim 32, wherein the instructions cause the computer to change the variable value to the new value after beginning to trace the data objects but before sweeping the heap.

36. A product according to claim 32, wherein the instructions cause the computer, after changing the variable value to the new value for a given one of the cycles, to check free memory remaining in the unallocated unit that was prepared for allocation prior to the given cycle, so as to ensure that the attribute of all of the free memory remaining is set to the new value.

37. A product according to claim 36, wherein in checking the free memory, the computer determines whether any of the memory in the unit was allocated over a predetermined period preceding the given cycle, and makes the unit unavailable for allocation if none of the memory was allocated over the predetermined period.

38. A product according to claim 36, wherein in checking the free memory, the computer changes the attribute of the free memory remaining to the new value.

39. A product according to claim 32, wherein the instructions cause the computer, after changing the variable value to the new value for a given one of the cycles, to render free memory remaining in the unallocated unit that was prepared for allocation prior to the given cycle unavailable for allocation in the given cycle.

40. A product according to claim 31, wherein the instructions cause a collector thread to run on the computer, which sets the attribute and which traces the data objects and sweeps the heap, and further cause a mutator thread to run on the computer, separate from the collector thread, which prepares the unallocated unit of the memory and allocates the data objects.

41. A product according to claim 40, wherein the mutator thread is further operative to alter data pointers associated with the data objects that it has allocated and to change the attribute of the data objects upon altering the pointers so that the objects are marked as reachable.

42. A product according to claim 41, wherein the collector thread and mutator thread operate on the memory concurrently.

43. A product according to claim 42, wherein the mutator thread changes the attribute upon altering the pointers to a value that is assigned by the collector thread, and which varies depending on a stage of progress by the collector thread in tracing the data objects and sweeping the heap.

44. A product according to claim 40, wherein the mutator thread allocates the objects without changing the attribute that has been set by the collector thread.

45. A product according to claim 31, wherein the unit of memory comprises a block in a block-managed memory system, and wherein multiple data objects are allocated within the block.

* * * * *